United States Patent

[11] 3,623,711

| | | |
|---|---|---|
| [72] | Inventor | Rolf A. Thorstenson<br>Westport, Conn. |
| [21] | Appl. No. | 54,302 |
| [22] | Filed | July 13, 1970 |
| [45] | Patented | Nov. 30, 1971 |
| [73] | Assignee | Avco Corporation<br>Stratford, Conn. |

[54] COMBUSTOR LINER COOLING ARRANGEMENT
3 Claims, 3 Drawing Figs.

[52] U.S. Cl. .................................................. 263/19 A,
60/39.65
[51] Int. Cl. ..................................................... F23l 9/04
[50] Field of Search .......................................... 263/19 A,
190; 60/39.65

[56] References Cited
UNITED STATES PATENTS

| | | | |
|---|---|---|---|
| 2,447,482 | 8/1948 | Arnold .......................... | 263/19 C |
| 2,606,014 | 8/1952 | Baumann ..................... | 263/19 A |
| 3,138,930 | 6/1964 | Waters et al. ................ | 60/39.65 |

FOREIGN PATENTS

| | | | |
|---|---|---|---|
| 763,692 | 12/1956 | Great Britain ............... | 60/39.65 |

Primary Examiner—John J. Camby
Attorneys—Charles M. Hogan and Irwin P. Garfinkle

ABSTRACT: The liner of a combustion chamber is provided with perforations through which coolant air passes. The perforations are sized so that a transpiration cooling effect results and the shape of the perforations is such that a component of flow of coolant air is produced along the thermally exposed surface of the liner. Thus, air passing through the perforations provides the combination of transpiration cooling and film cooling.

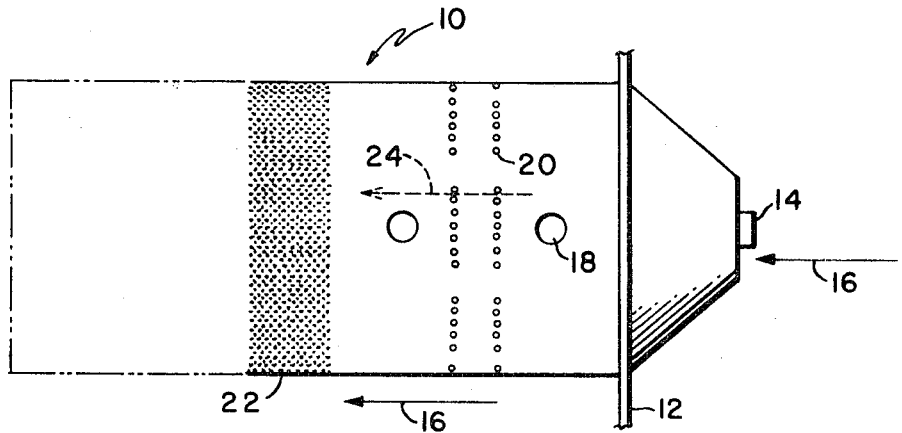
Fig. 1
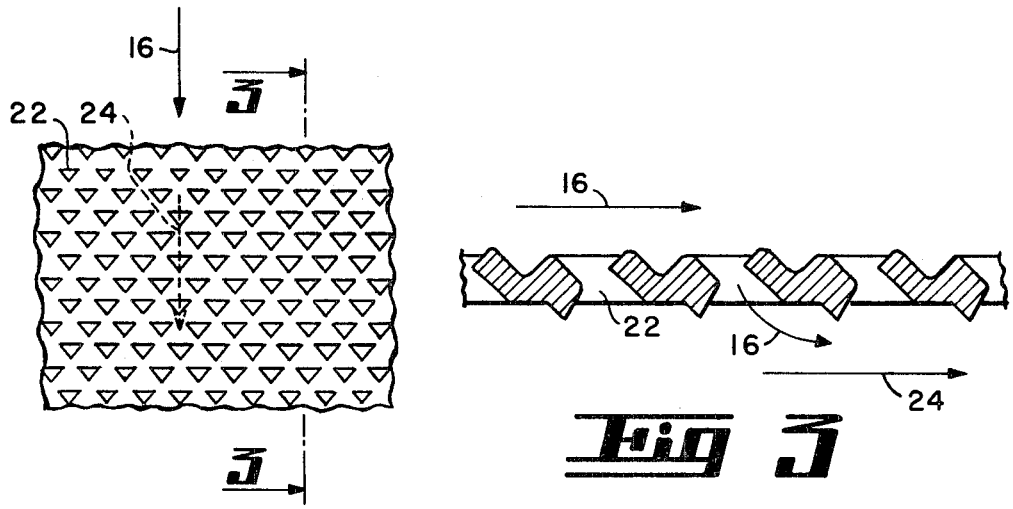
Fig. 2
Fig. 3
INVENTOR.
ROLF A. THORSTENSON

COMBUSTOR LINER COOLING ARRANGEMENT

BACKGROUND OF THE INVENTION

This invention was made in the course of a contract with the U.S. Government Department of the Army.

There is at the present time a demand for the reduction in the size of gas turbine engines, while at the same time increasing power output. As a result, the various operating temperatures of the gas turbine engine exceed those temperatures which the best superalloys can withstand. One of the most critical components of the modern gas turbine engine is the combustor.

Various methods have been used to cool a combustion chamber. One of the most effective of these involves transpiration cooling. Another involves convection cooling. The present invention provides a combination of transpiration and convection cooling.

Transpiration cooling is the process whereby a fluid effuses through a porous structure into the boundary layer on the hot gas side in order to maintain the structure internally at a temperature below that of the external gas stream. Cooling is accomplished as a result of two phenomena: (1) Absorption of heat within the wall by the coolant; and (2) alteration of the boundary layer, thereby reducing the skin friction and heat transfer through the boundary layer.

The degree of success to which transpiration cooling is achieved in practice is dependent on the boundary layer profile which is obtained. When the flow through the porous structure results in discrete regions on the surface where effused flow exists and other regions of no effusion flow (as viewed from the boundary layer), at this point transpiration cooling ceases to exist and the mechanism may better be defined as pseudotranspiration cooling. At this point the boundary layer conditions change from one locality on the porous surface to another, resulting in disturbances of the boundary layer characteristic. Even though the disruptive effects are significant enough to produce minor change in the character of the boundary layer in a pseudotranspiration case, the effects in a gross sense do not result in a complete alteration of the boundary layer characteristic. The present invention tends to fall into the pseudotranspiration as well as in the transpiration categories. In addition to cooling by a transpiration cooling process, the pores are shaped so as to provide a velocity component to the boundary layer in the direction of flow of the hot gases. As a result of the directional quality of the effuse coolant fluid into the hot gas side boundary layer, a momentum component in the flow direction will assist in stabilizing the boundary layer in similar manner as tangential injection does in the case of film-type boundary layer cooling.

SUMMARY OF THE INVENTION

The invention provides cooling for a metal surface over which hot gases are flowing. The cooling results from the effusion of coolant gas through pores in the metal into the hot gas stream, the pores being shaped to impart a velocity component to the coolant gas in the direction of the hot gas flow.

THE DRAWINGS

FIG. 1 illustrates a gas turbine combustion chamber liner having perforations in accordance with this invention;

FIG. 2 is an enlarged view showing the shape of the perforations; and

FIG. 3 is an enlarged cross section taken through the line 3—3 in FIG. 2.

DESCRIPTION OF THE ILLUSTRATED EMBODIMENT

The drawing illustrates a liner 10 for a conventional can-type combustor for gas turbine engines. The liner 10 is mounted within the engine housing by means of a mounting ring 12 through which compressor air can flow. Mounted at one end of the liner is a conventional nozzle 14 through which fuel is admitted. Compressor air, indicated by the arrow 16, enters the liner at several locations including the location adjacent the nozzle 14, at perforations 18 and 20, and at the perforations 22 provided in accordance with this invention. The hot burning gases, indicated by the arrow 24, travel within the liner in a direction away from the nozzle. The compressor air admitted at the perforations 18, 20 and 22 is used to cool the liner. The perforations 18 and 20 are conventional. The perforations 22 are shown in FIGS. 2 and 3.

The portion of the liner containing the perforations 22 is pierced with generally triangular-shaped holes over the entire area to be so cooled. The perforated portion of the liner is made from flat sheet stock, perforated by a punch and die process and then rolled to produce the design flow versus pressure characteristics that are required for a particular system. The perforation design is such as to impart a component of flow along the thermally exposed surface, thus providing a film-cooling effect which aids in the cooling efficiency of the perforated sheet. The factor in providing the velocity component along the thermally exposed surface is the punching of the perforations at an angle to the surface of the flat sheet. In practice, a perforation made at an angle of approximately 45° produced optimum results.

While the flow of coolant compressor air 16 is shown to be in the same direction as the flow of hot gases and in the same direction as the component of flow providing a film, it should be noted that coolant air supplied from any direction will enter the liner with the velocity component in the direction shown. The size of the velocity component depends, of course, on the various pressures and other parameters of the overall system.

SUMMARY

In summary, I have produced a liner for a combustion chamber which is supplied with coolant air through uniquely designed perforations. The perforations are sized so as to provide a porous-type structure so that transpiration cooling results and are shaped to impart a velocity component along the thermally exposed surface.

What is claimed is:

1. A combustion chamber comprising a wall, the inner surface of said wall providing a passage for the flow of hot-burning gases, the outer surface of said wall being supplied with coolant air, said wall being provided with a plurality of closely spaced perforations, said perforations being sized and shaped to provide a porous-type structure whereby the effusion of coolant air through said perforations results in transpiration-type cooling, said perforations being disposed at an angle to said wall, said angle being inwardly disposed from the outer surface to the inner surface in a downstream direction to impart a velocity component to said coolant air along the inner surface of said wall in the direction of flow of said hot gases.

2. The invention as defined in claim 1 wherein said angle is inwardly disposed at approximately 45° with respect to said direction of flow.

3. The invention as defined in claim 1 wherein said perforations are punched holes, said holes being punched from said outer surface of said wall toward said inner surface in a direction having a component parallel to the direction of said flow.

* * * * *